(12) United States Patent
Volek

(10) Patent No.: US 7,887,748 B2
(45) Date of Patent: Feb. 15, 2011

(54) SOLDER MATERIAL FOR SOLDERING COMPONENTS

(75) Inventor: Andreas Volek, Herzogenaurach (DE)

(73) Assignees: Siemens Aktiengesellschaft, Munich (DE); MTU Aero Engines GmbH, Munich (DE)

( * ) Notice: Subject to any disclaimer, the term of this patent is extended or adjusted under 35 U.S.C. 154(b) by 95 days.

(21) Appl. No.: 12/085,277

(22) PCT Filed: Oct. 31, 2006

(86) PCT No.: PCT/EP2006/067951

§ 371 (c)(1),
(2), (4) Date: May 20, 2008

(87) PCT Pub. No.: WO2007/060080

PCT Pub. Date: May 31, 2007

(65) Prior Publication Data

US 2009/0283572 A1 Nov. 19, 2009

(30) Foreign Application Priority Data

Nov. 28, 2005 (EP) .................................. 05025898

(51) Int. Cl.
*C22C 19/05* (2006.01)
(52) U.S. Cl. ..................................................... 420/448
(58) Field of Classification Search .................. 75/255; 228/119, 262.31; 420/448
See application file for complete search history.

(56) References Cited

U.S. PATENT DOCUMENTS

| | | | |
|---|---|---|---|
| 3,632,319 A | | 1/1972 | Hoppin et al. |
| 4,677,035 A | * | 6/1987 | Fiedler et al. ............... 428/680 |
| 5,320,690 A | | 6/1994 | Beltran et al. |
| 5,395,584 A | * | 3/1995 | Berger et al. ................ 420/443 |
| 6,050,477 A | | 4/2000 | Baumann et al. |

FOREIGN PATENT DOCUMENTS

| | | |
|---|---|---|
| EP | 0 870 566 A1 | 10/1998 |
| EP | 0 908 265 A2 | 4/1999 |
| EP | 1 258 545 A1 | 11/2002 |
| EP | 1 306 454 B1 | 5/2003 |
| EP | 1 319 729 A1 | 6/2003 |
| EP | 1 204 776 B1 | 6/2004 |
| EP | 1 561 536 A1 | 8/2005 |
| GB | 2 162 199 A | 1/1986 |
| WO | WO 95/35396 | 12/1995 |
| WO | WO 99/67435 | 12/1999 |
| WO | WO 00/44949 | 8/2000 |
| WO | WO 2005/028690 A1 | 3/2005 |

OTHER PUBLICATIONS

S.K. Tung, L.C. Lim, M.O. Lai and H. Wu, "Evolution of nickel borides in Ni-Si-B brazed joints of nickel during post-braze heat treatment", Materials Science and Technology, Dec. 1997, vol. 13, pp. 1051-1056, Abstract.
Bradley, Superalloys—A Technical Guide, Chapter 13 Welding, pp. 197-220, Metals Park, ASM International, US XP002383837, 1989.
Bradley, "Superalloys—A Technical Guide", Chapter 13—Welding, Jan. 1, 1988, pp. 197-199, 201, 207, 212, Metals Park. ASM International, US, XP002383837 (XP002361607).

* cited by examiner

*Primary Examiner*—Roy King
*Assistant Examiner*—Ngoclan T Mai

(57) ABSTRACT

The invention relates to a method for repairing components that consist of superalloys, in particular for repairing components that consist of a superalloy with an aligned microstructure in such a way that the repaired site likewise has an aligned microstructure. The method comprises the following steps: a solder material is applied to the repair site; the repair site with the applied solder material is heated until the latter melts; and the melted solder material is left to solidify. The solder material is an alloy with the same alloy components as the component alloy. At least the fraction of one alloy component in the solder material composition is modified in relation to the fraction of that alloy component in the component alloy composition, in such a way that the melting temperature of the solder material is reduced in relation to the melting temperature of the component alloy.

2 Claims, 5 Drawing Sheets

SOLDER MATERIAL FOR SOLDERING COMPONENTS

CROSS REFERENCE TO RELATED APPLICATIONS

This application is the US National Stage of International Application No. PCT/EP2006/067951, filed Oct. 31, 2006 and claims the benefit thereof. The International Application claims the benefits of European application No. 05025898.7 filed Nov. 28, 2005, both of the applications are incorporated by reference herein in their entirety.

FIELD OF INVENTION

The present invention relates to a method for repairing cracks in components which consist of a superalloy, particularly a superalloy having a directional microstructure, the method then in particular being configured so that a repaired crack likewise has a directional microstructure. The invention furthermore relates to a solder material for soldering components which consist of a superalloy, in particular one having a directional microstructure.

BACKGROUND OF THE INVENTION

The improvement of aircraft gas turbines and electrical energy generation by means of static gas turbines is moving evermore into the foreground owing to the high efficiencies achievable with gas turbines. In a gas turbine, air taken in is compressed and supplied to a combustion chamber. In the combustion chamber, a mixture of the supplied air and a fuel is ignited and the hot combustion gases, which are at a high pressure, are delivered to a turbine section of the gas turbine. The combustion gases are used as a working medium which causes the turbine to rotate, typically with a frequency of from 50 to 60 Hz. The working medium arrives at the first turbine blades with a temperature of around 1200° C. Owing to the rotation, the hot turbine blades are exposed to high static loads due to centrifugal forces. Furthermore, dynamic loads are induced by the hot gas flowing in. Depending on the fuel being used, more or less strong corrosive loads also occur on the components of the turbine section, in particular on the turbine blades.

For example, the rotor blades of the first rotor blade row of the turbine are therefore often made from so-called refractory superalloys based on nickel, cobalt or iron. Such superalloys are known for example from EP 1 204 776 B1, EP 1 306 454, EP 1 319 729 A1, WO 99/67435 or WO 00/44949.

Owing to the usually extremely complex blade design and the relatively low suitability of such alloys for being shaped, turbine blades are produced by the vacuum casting method. The solidification process is controlled so as to form a directional microstructure in the component, which has a particularly advantageous orientation in relation to the loads subsequently occurring. The term "directional microstructure" is intended to mean both monocrystalline structures and structures having a grain structure in which the extent of the grains has a common preferential direction. In the latter case, the grains may for example have a larger dimension in a particular preferential direction than in the other directions (so-called columnar crystals). Components having such a grain structure are also referred to as directionally solidified components.

The effect of the constant high static and dynamic loads on turbine components, and in particular rotor blades of the turbine section, is that they are subjected to revision at regular intervals in order to assess them in respect of their suitability for further use. In the scope of this revision process, damaged components are either replaced or repaired. Besides great material losses due to corrosion, fatigue cracks in particular are the most frequently occurring reasons for replacement of the components. Particularly in the case of rotor blades, such fatigue cracks occur transversely to the blade longitudinal axis.

Owing to the high material and production costs for turbine components having a directional microstructure, a power plant operator or a manufacturer of aircraft turbines must calculate in relatively high costs, for example to replace turbine blades, for the maintenance of a gas turbine system. Against the background of a rising cost pressure, repair methods which restore the operability of a damaged turbine component, in particular a damaged rotor blade, therefore become increasingly attractive. A repaired component may then be reinstalled in the gas turbine system and be used further until the next revision process.

One possibility for repairing damaged components is soldering. For example, a solder material is introduced into a crack in the component and is bonded to the material of the superalloy by the action of heat. The soldering process may be carried out isothermally, i.e. at constant temperature, or with the use of a temperature gradient.

A method for the isothermal soldering of monocrystalline objects is described for example in EP 1 258 545. In this case, a crack is filled with a solder material that resembles the superalloy of the component in its composition, and which is then kept at a temperature above the melting point of the solder material for a prolonged period of time. Boron is added to the solder material in order to lower the melting temperature. Owing to the high temperature, diffusion processes take place that induce concentration equilibration between the solder material and the superalloy, which leads to solidification of the solder material. With gap widths up to about 200 µm, the solidified solder material adopts the directional microstructure of the surrounding superalloy. Boron, however, may lead to the formation of brittle borides which impair the properties of the component in the region of the repaired site. Furthermore, the method is not suitable for gap widths of more than about 200 µm.

The formation of borides is thematized for example in S. K. Tung et al. "Evolution of nickel borides in Ni—Si—B brazed joints of nickel during post-braze heat treatment", Materials Science and Technology, Dec. 1997, Vol. 13, pages 1051-1056.

A method for soldering directionally solidified or monocrystalline components with the use of a temperature gradient is described for example in EP 0 870 566. In this method a solder alloy that consists for example of the basic material of the part to be repaired, with the addition of one or more extra elements which reduce the melting point, is applied onto the site to be repaired. Boron and silicon are mentioned as elements which lower the melting point. The part to be repaired is moved with the applied solder alloy through a heated zone, the temperature applied in this heated zone by the heating being above the melting temperature of the solder alloy but lower than the local pre-melting temperature of the part. Partial melting of the superalloy of the part to be repaired does not therefore take place. A thermal gradient is generated in the solder product owing to the movement, which leads to directional solidification of the solder product. Constituents that lower the melting point are also added to the solder product in this case, which for example in the case of boron may negatively affect the properties of the repaired site.

Solder materials which contain boron are also described for example in GB 2 162 199 A and GB 0 100 919 A1.

EP 0 908 265 A2 describes a nickel-based solder material, which is obtained by adding at least one of the following constituents to a nickel powder: nickel, chromium, nickel-chromium alloys and stainless steel.

SUMMARY OF INVENTION

It is an object of the present invention to provide a method which is advantageous relative to the prior art for repairing components which consist of a superalloy, in particular a superalloy having a directional microstructure.

It is another object of the present invention to provide a solder material which may advantageously be used for soldering superalloys, in particular for soldering superalloys having a directional microstructure.

The first object is achieved by a method for repairing components as claimed in the claims, and the second object is achieved by a solder material as claimed in the claims. The dependent claims contain advantageous configurations of the method according to the invention.

In the method according to the invention, components which consist of a superalloy are repaired. The superalloy may in particular have a directional microstructure, the method then in particular being configured so that a repaired crack likewise has a directional microstructure. A directional microstructure is to be understood in the scope of the present application to be a monocrystalline or a rod-crystalline structure.

The method comprises the steps:
providing the site to be repaired with a solder material,
heating the site to be repaired, provided with the solder material, until the solder material melts and
allowing the molten solder material to solidify.

In the method according to the invention, the solder material is an alloy which has the same alloy constituents as the alloy of the component. At least one proportion of an alloy constituent in the composition of the solder material is modified relative to its proportion in the composition of the alloy of the component such that the melting temperature of the solder material is lowered relative to the melting temperature of the alloy of the component.

The method according to the invention makes it possible to obviate the additional elements that lower the melting point, and in particular to obviate boron or silicon which may lead to the brittle phases mentioned in the introduction. The method according to the invention makes it possible in particular to lower the melting temperature of solder materials for superalloys based on nickel, cobalt or iron, which comprises at least one of the elements Al (aluminum), Ti (titanium), Ta (tantalum), Cr (chromium), Co (cobalt), Mo (molybdenum), W (tungsten), Nb (niobium) as main alloy elements. The melting temperature of the solder material may be lowered relative to the melting temperature of the superalloy for example when the proportion of at least one of the elements Al, Ti, Ta, Nb in the alloy of the solder material is increased relative to its proportion in the superalloy and/or the proportion of the element W in the alloy of the solder material is reduced relative to its proportion in the superalloy. It is also preferable to use only Al and Ti.

When the superalloy has the following composition: from 2 to 16 wt. % Cr; from 0 to 15 wt. % Co; from 0 to 3 wt. % Mo; from 0 to 10 wt. % W; from 0 to 12 wt. % Ta; from 0 to 6 wt. % Re (rhenium); from 0 to 1 wt. % V (vanadium); from 0 to 0.5 wt. % Nb; from 0.05 to 6.5 wt. % Al; from 0 to 5 wt. % Ti; from 0 to 0.2 wt. % Hf (hafnium); remainder Ni, then for example the proportions of Ta and/or Ti may be increased relative to the composition of the superalloy in order to lower the melting temperature of the solder material relative to the melting temperature of the superalloy.

The molten solder material may be allowed to solidify with a temperature kept constant, i.e. in the form of isothermal solidification. As an alternative, it is also possible to allow the molten solder material to solidify with the use of a temperature gradient. The temperature gradient is advantageously aligned so that it extends in the direction in which the directional microstructure of the component extends in the region of the site to be repaired. Various heating methods are suitable for producing the temperature gradient. In particular, local heating may be carried out by means of an optical or inductive heating method or by means of an electron beam heating method, the heat source and the component being moved relative to one another. In this configuration, the orientation of the microstructure in the solidified solder material may be established by the direction of movement between the heat source and the component.

A solder material according to the invention for soldering components which consist of a superalloy, particularly a superalloy having a directional microstructure, is an alloy having the same alloy constituents as the alloy of the component. In the solder material according to the invention, at least one proportion of an alloy constituent in the composition of the solder material is modified relative to its proportion in the composition of the alloy of the component such that the melting temperature of the solder material is lowered relative to the melting temperature of the alloy of the component. It is therefore possible to substantially obviate the element that lowers the melting point in the solder, which may lead to the brittle phases mentioned in the introduction, in particular boron or silicon. The solder material is suitable in particular for carrying out the method according to the invention.

A nickel- or cobalt-based superalloy may for example be envisaged as the alloy, which additionally comprises at least one of the elements Al, Ti, Ta, Cr, Co, Mo, W, Nb as main alloy elements. The proportion of at least one of the elements Al, Ti, Ta, Nb in the alloy of the solder material may be increased relative to its proportion in the superalloy and/or the proportion of the element W in the alloy of the solder material may be reduced relative to its proportion in the superalloy. In particular, the superalloy may have the following composition:

from 2 to 16 wt. % Cr
from 0 to 15 wt. % Co
from 0 to 3 wt. % Mo
from 0 to 10 wt. % W
from 0 to 12 wt. % Ta
from 0 to 6 wt. % Re
from 0 to 1 wt. % V
from 0 to 0.5 wt. % Nb
from 0.05 to 6.5 wt. % Al
from 0 to 5 wt. % Ti
from 0 to 0.2 wt. % Hf
remainder Ni.

The proportions of Ta and/or Ti in the alloy of the solder material are then increased relative to the composition of the superalloy, so that the melting temperature of the solder material is lowered relative to the superalloy.

BRIEF DESCRIPTION OF THE DRAWINGS

Other features, properties and advantages of the present invention will be found in the following description of an exemplary embodiment with reference to the appended figures.

DETAILED DESCRIPTION OF INVENTION

Figure 1:
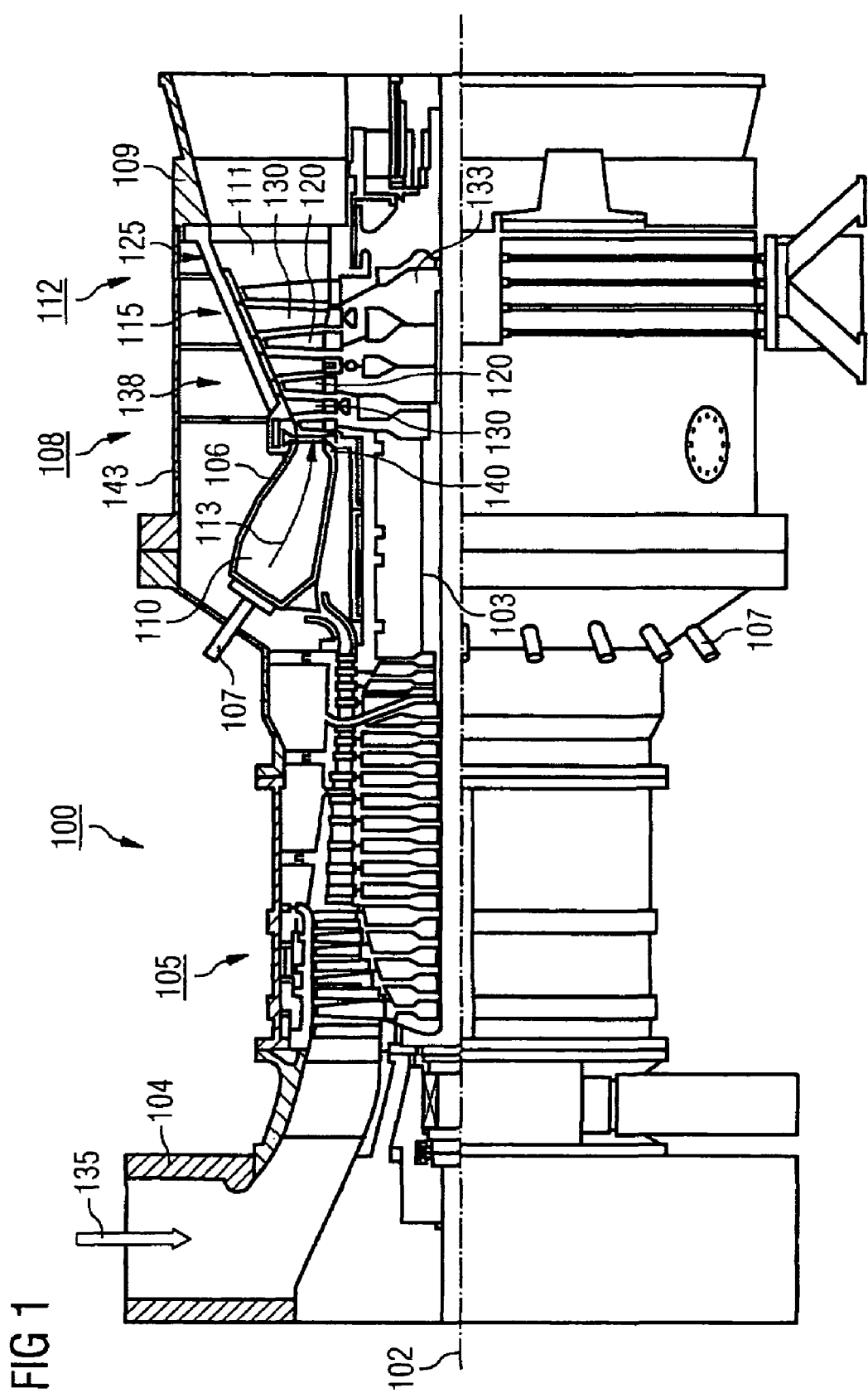
FIG. 1 shows a gas turbine by way of example in a partial longitudinal section.

FIG. 1 shows a gas turbine 100 by way of example in a partial longitudinal section. The gas turbine 100 internally comprises a rotor 103, which will also be referred to as the turbine rotor, mounted so as to rotate about a rotation axis 102. Successively along the rotor 103, there are an intake manifold 104, a compressor 105, an e.g. toroidal combustion chamber 110, in particular a ring combustion chamber 106, having a plurality of burners 107 arranged coaxially, a turbine 108 and the exhaust manifold 109.

The ring combustion chamber 106 communicates with an e.g. annular hot gas channel 111. There, for example, four successively connected turbine stages 112 form the turbine 108.

Each turbine stage 112 is formed for example by two blade rings. As seen in the flow direction of a working medium 113, a guide vane row 115 is followed in the hot gas channel 111 by a row 125 formed by rotor blades 120.

The guide vanes 130 are fastened on an inner housing 138 of a stator 143 while the rotor blades 120 of a row 125 are fitted on the rotor 103, for example by means of a turbine disk 133.

Coupled to the rotor 103, there is a generator or a work engine (not shown).

During operation of the gas turbine 100, air 135 is taken in and compressed by the compressor 105 through the intake manifold 104. The compressed air provided at the turbine-side end of the compressor 105 is delivered to the burners 107 and mixed there with a fuel. The mixture is then burnt to form the working medium 113 in the combustion chamber 110. From there, the working medium 113 flows along the hot gas channel 111 past the guide vanes 130 and the rotor blades 120. At the rotor blades 120, the working medium 113 expands by imparting momentum, so that the rotor blades 120 drive the rotor 103 and the work engine coupled to it.

During operation of the gas turbine 100, the components exposed to the hot working medium 113 experience thermal loads. Apart from the heat shield elements that line the ring combustion chamber 106, the guide vanes 130 and rotor blades 120 of the first turbine stage 112, as seen in the flow direction of the working medium 113, are heated the most.

In order to withstand the temperatures prevailing there, they may be cooled by means of a coolant.

Substrates of the components may likewise comprise a directional structure, i.e. they are monocrystalline (SX structure) or comprise only longitudinally directed grains (DS structure).

Iron-, nickel- or cobalt-based superalloys are for example used as the material for the components, in particular for the turbine blades 120, 130 and components of the combustion chamber 110. Such superalloys are known for example from EP 1 204 776 B1, EP 1 306 454, EP 1 319 729 A1, WO 99/67435 or WO 00/44949 are used; these documents are part of the disclosure.

The blades 120, 130 may likewise have coatings against corrosion (MCrAlX; M is at least one element from the group ion (Fe), cobalt (Co), nickel (Ni), X is an active element and stands for yttrium (Y) and/or silicon and/or at least one rare earth element, or hafnium). Such alloys are known from EP 0 486 489 B1, EP 0 786 017 B1, EP 0 412 397 B1 or EP 1 306 454 A1, which are intended to be part of this disclosure.

On the MCrAlX, there may also be a thermal insulation layer which consists for example of $ZrO_2$, $Y_2O_3$—$ZrO_2$, i.e. it is not stabilized or is partially or fully stabilized by yttrium oxide and/or calcium oxide and/or magnesium oxide.

Rod-shaped grains are produced in the thermal insulation layer by suitable coating methods, for example electron beam deposition (EB-PVD).

The guide vanes 130 comprise a guide vane root (not shown here) facing the inner housing 138 of the turbine 108, and a guide vane head lying opposite the guide vane root. The guide vane head faces the rotor 103 and is fixed on a fastening ring 140 of the stator 143.

Figure 2:
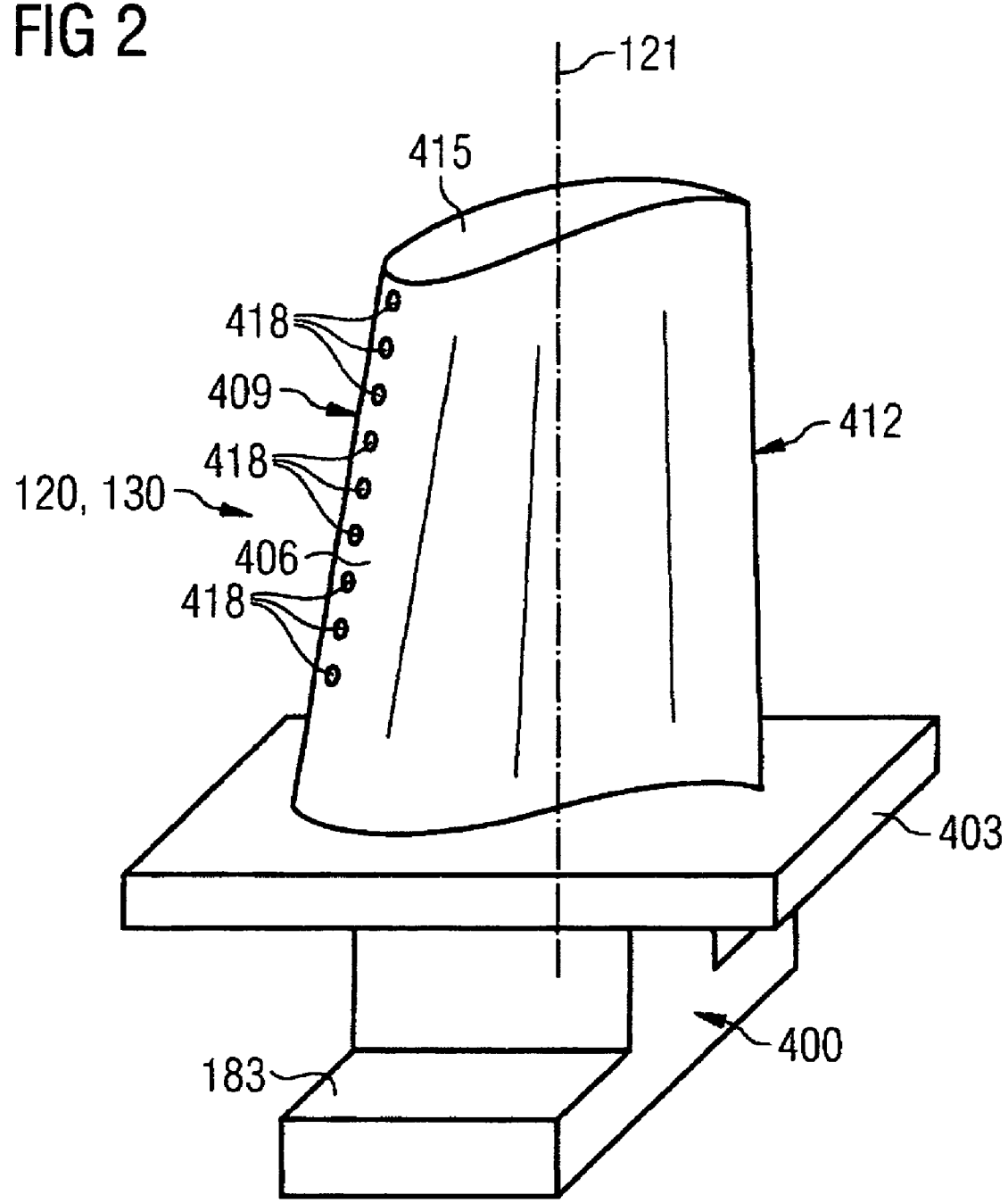
FIG. 2 shows a rotor blade or guide vane of a turbomachine in a perspective view

FIG. 2 shows a perspective view of a rotor blade 120 or guide vane 130 of a turbomachine, which extends along a longitudinal axis 121.

The turbomachine may be a gas turbine of an aircraft or of a power plant for electricity generation, a steam turbine or a compressor.

The blade 120, 130 comprises, successively along the longitudinal axis 121, a fastening zone 400, a blade platform 403 adjacent thereto as well as a blade surface 406. As a guide vane 130, the vane 130 may have a further platform (not shown) at its vane tip 415.

The blade root 183 is configured as a hammerhead. Other configurations are possible, for example as a firtree or dovetail root.

The blade 120, 130 comprises a leading edge 409 and a trailing edge 412 for a medium which flows past the blade surface 406.

In conventional blades 120, 130, for example solid metallic materials, in particular superalloys, are used in all regions 400, 403, 406 of the blade 120, 130. Such superalloys are known for example from EP 1 204 776 B1, EP 1 306 454, EP 1 319 729 A1, WO 99/67435 or WO 00/44949; these documents are part of the disclosure. The blades 120, 130 may in this case be manufactured by a casting method, also by means of directional solidification, by a forging method, by a machining method or combinations thereof.

Workpieces with a monocrystalline structure or rod-crystalline structure are used as components for machines which are exposed to heavy mechanical, thermal and/or chemical loads during operation. Such monocrystalline or rod-crystalline workpieces are manufactured, for example, by directional solidification from the melts. These are casting methods in which the liquid metal alloy is solidified to form the monocrystalline structure, i.e. to form the monocrystalline workpiece, or is directionally solidified. Dendritic crystals are in this case aligned along the heat flux and form either a rod-crystalline grain structure (columnar, i.e. grains which extend over the entire length of the workpiece and in this case, according to general terminology usage, are referred to as directionally solidified) or a monocrystalline structure, i.e. the entire workpiece consists of a single crystal. It is necessary to avoid the transition to globulitic (polycrystalline) solidification in these methods, since nondirectional growth will necessarily form transverse and longitudinal grain boundaries which negate the beneficial properties of the directionally solidified or monocrystalline component.

When directionally solidified structures are referred to in general, this is intended to mean both single crystals which have no grain boundaries or at most small-angle grain boundaries, and also rod crystal structures which, although they do have grain boundaries extending in the longitudinal direction, do not have any transverse grain boundaries. These latter crystalline structures are also referred to as directionally solidified structures. Such methods are known from U.S. Pat. No. 6,024,792 and EP 0 892 090 A1; these documents are part of the disclosure.

The blades 120, 130 may likewise have coatings against corrosion or oxidation (MCrAlX; M is at least one element from the group ion (Fe), cobalt (Co), nickel (Ni), X is an active element and stands for yttrium (Y) and/or silicon and/or at least one rare earth element, or hafnium (Hf)). Such alloys are known from EP 0 486 489 B1, EP 0 786 017 B1, EP 0 412 397 B1 or EP 1 306 454 A1, which are intended to be part of this disclosure.

On the MCrAlX, there may also be a thermal insulation layer which consists for example of $ZrO_2, Y_2O_3$—$ZrO_2$, i.e. it is not stabilized or is partially or fully stabilized by yttrium oxide and/or calcium oxide and/or magnesium oxide. Rod-shaped grains are produced in the thermal insulation layer by suitable coating methods, for example electron beam deposition (EB-PVD).

Refurbishment means that components 120, 130 may need to have protective layers removed (for example by sandblasting) after their use. Then the corrosion and/or oxidation layers or products are removed. Optionally, cracks in the component 120, 130 are also repaired. The component 120, 130 is then recoated and the component 120, 130 is used again.

The blade 120, 130 may be designed to be hollow or solid. If the blade 120, 130 is intended to be cooled, it will be hollow and optionally also comprise film cooling holes 418 (indicated by dashes).

Figure 3:
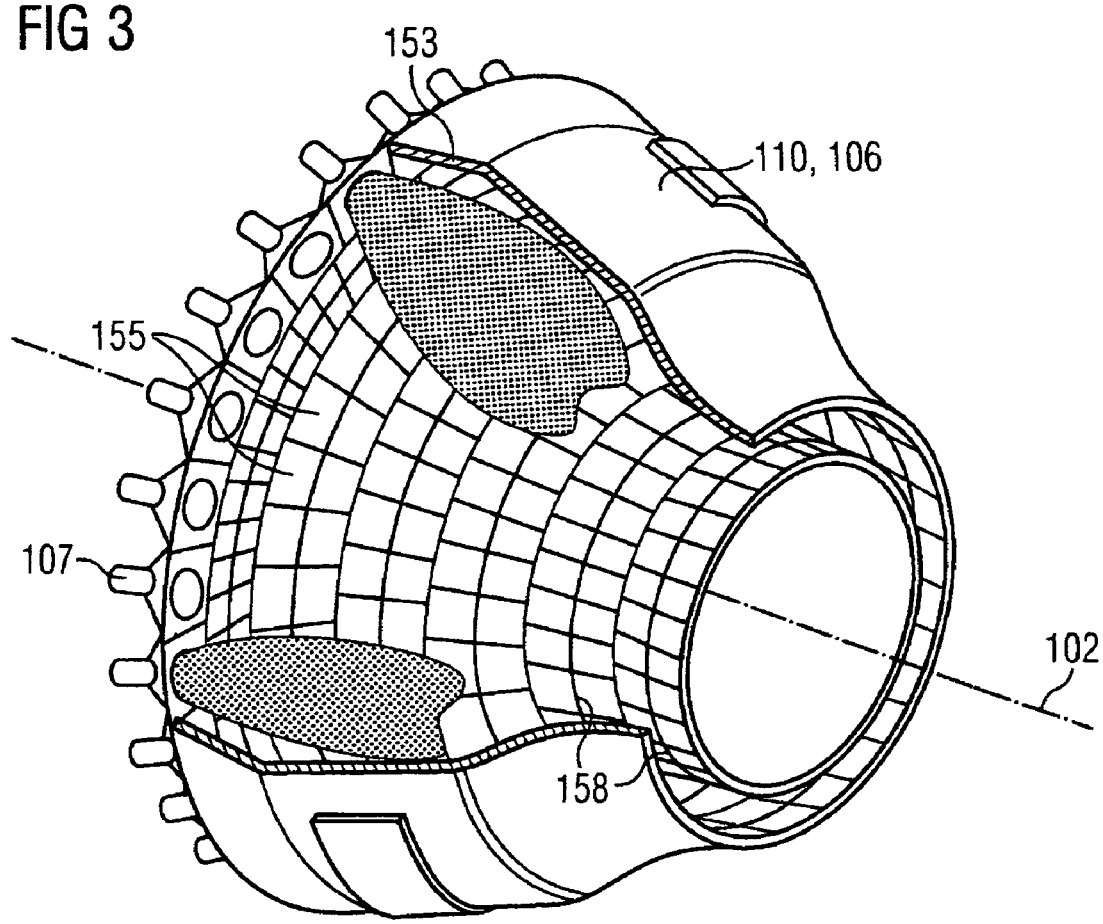
FIG. 3 shows a combustion chamber of a gas turbine.

FIG. 3 shows a combustion chamber 110 of a gas turbine. The combustion chamber 110 is designed for example as a so-called ring combustion chamber in which a multiplicity of burners 107, arranged in the circumferential direction around the rotation axis 102, open into a common combustion chamber space. To this end, the combustion chamber 110 as a whole is designed as an annular structure which is positioned around the rotation axis 102.

In order to achieve a comparatively high efficiency, the combustion chamber 110 is designed for a relatively high temperature of the working medium M, i.e. about 1000° C. to 1600° C. In order to permit a comparatively long operating time even under these operating parameters which are unfavorable for the materials, the combustion chamber wall 153 is provided with an inner lining formed by heat shield elements 155 on its side facing the working medium M.

Each heat shield element 155 is equipped with a particularly heat-resistant protective layer on the working medium side, or is made of refractory material. These may be ceramic components, solid ceramic blocks or alloys with MCrAlX and/or ceramic coatings. The materials of the combustion chamber wall and their coatings may be similar to the turbine blades.

Owing to the high temperatures inside the combustion chamber 110, a cooling system may also be provided for the heat shield elements 155 or for their retaining elements.

The combustion chamber 110 is in particular designed in order to detect losses of the heat shield elements 155. To this end, a number of temperature sensors 158 are positioned between the combustion chamber wall 153 and the heat shield elements 155.

Figure 4:
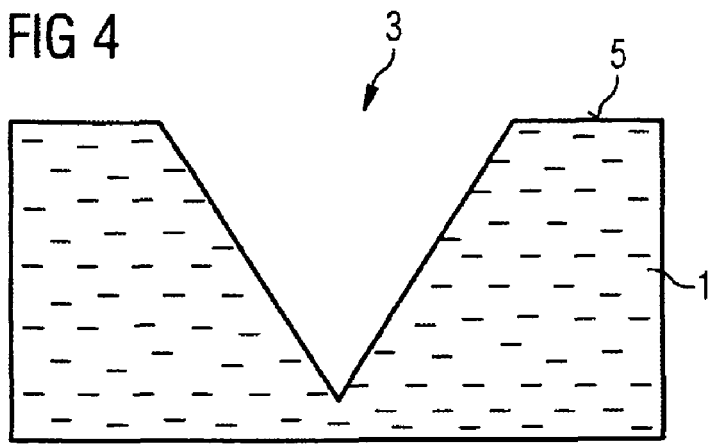
FIGS. 4 to 7 show an exemplary embodiment of the method according to the invention.

FIG. 4 represents a highly schematized representation of a gas turbine blade 1 with a crack 3 as a component to be repaired. The turbine blade 1 is made from a nickel-based superalloy known by the designation PWA 1483. This has the following composition (all data in wt. %):

Cr: 12.2%
Co: 9%
Mo: 1.9%
W: 3.8%
Ti: 4.1%
Ta: 5%
C: 0.07%
remainder Ni.

In principle, however, the turbine blade 1 may also consist of other nickel-, cobalt- or iron-based superalloys, in particular ones which contain the elements chromium (Cr), tungsten (W), molybdenum (Mo), aluminum (Al), tantalum (Ta) or rhenium (Rh) besides the main constituent nickel (Ni).

Further preferably used superalloys are PWA1484 (/SX) and Rene N5 or the CMSX material group.

Figure 5:
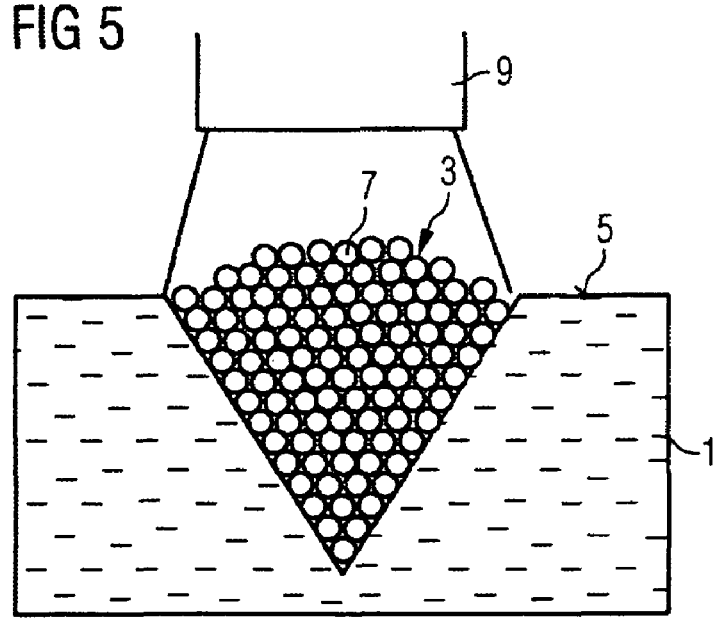
Figure 6:
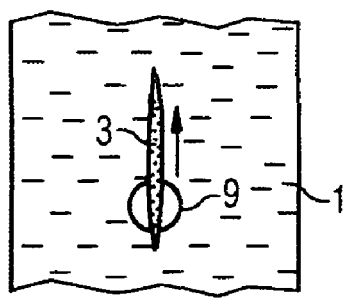

The superalloy has a directional microstructure, with an advantageous orientation which is indicated by horizontal dashes in FIGS. 4 to 6. It may be pointed out here that in the case of a rod-crystalline structure, there is a preferential direction of the crystal orientation but this does not represent a direction which is strictly adhered to. Rather, the actual orientation of the individual grains of the rod-crystalline structure generally varies by a few degrees around the preferential direction. Such a variation entails advantages in relation to the strength of the material. The crack 3 extends into the superalloy, starting from the surface 5 of the turbine blade 1. In order to repair the component, the crack 3 is filled with a solder material 7 in the form of a powdered alloy material. The turbine blade 1 with the crack 3 filled with solder material 7 is represented in FIG. 5.

The powder particles of the alloy material comprise the same alloy elements as the superalloy of the turbine blade 1. However, the proportion of Ti in the alloy material of the powder particles is increased by at least about 5 wt. % relative to its proportion in the superalloy of the turbine blade 1. The other constituents of the powder particles correspond in their proportions to the proportions which they have in the superalloy of the turbine blade 1. Owing to the increased proportion of titanium in the alloy composition of the powder compared with the alloy composition of the superalloy of the turbine component 1, the melting temperature of the solder material 7 is reduced so that the maximum possible soldering temperature is reached.

The melting temperature of the solder material may be lowered by varying the wt. % proportion of constituents other than titanium. For instance, the melting temperature may in principle be lowered when the wt. % proportion of the elements Al, Ti, Ta, Nb in the alloy of the solder material 7 is increased relative to the proportion in the superalloy and/or the proportion of the element W in the alloy of the solder material 7 is reduced relative to the proportion in the superalloy. By suitable selection of the wt. % proportions of these elements in the alloy of the solder material compared with their proportion in the superalloy of the turbine component 1, the melting temperature of the solder material 7 can be adjusted in a wide range. By suitable optimization of the composition, it is thus possible to provide a solder material 7 whose elements are the same as the elements of the alloy of the turbine blade 1 to be repaired and which has a melting temperature (liquidus temperature) that is less than or equal to the maximum soldering temperature of the superalloy.

Figure 8:
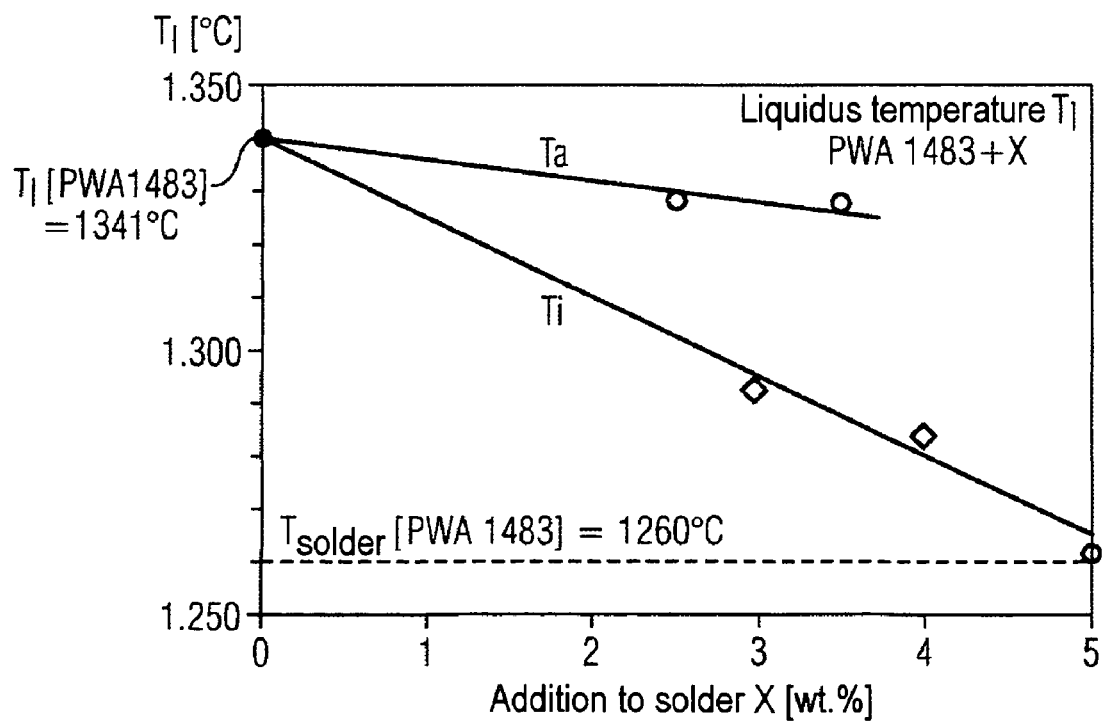
FIG. 8 shows the dependency of the melting temperature of an alloy on its Ti or Ta proportion.

The effect for example of the alloy elements Ti and Ta on the melting temperature of the solder material is represented in FIG. 8, which shows the melting temperature of the alloy as a function of the proportion of Ti or Ta.

After the crack 3 has been filled with the solder material 7, local action of heat takes place in the region of the field crack 3. In order to apply the action of heat to the solder material 7, in the present exemplary embodiment a laser 9 is provided which shines onto the solder to be melted and thus supplies it with the heat required for melting. As an alternative, the heat could however also be supplied inductively or by means of an electron beam.

During the soldering process, a temperature gradient is established in the region of the crack 3. This is done by moving the turbine blade 1 and the laser 9 relative to one another. In the exemplary embodiment, the laser 9 is guided over the surface of the solder 7, parallel to the surface 5 of the turbine blade 1 (cf. FIGS. 5 and 6). The speed and the power density, with which the laser 9 is guided over the solder material 7, are selected so that the desired temperature gradient is set up in the solder material 7. The temperature gradient leads to directional solidification of the solder material, when it cools again after melting. The steepness of the temperature gradient can be adjusted by the movement speed of the laser relative to the turbine blade 1 and/or the laser power. The steepness of the temperature gradient is intended here to mean the increase or decrease in the temperature per unit length. The steepness leading to the creation of a directional microstructure in the solidified solder material depends in particular on the composition of the solder material.

The movement of the laser 9 in the exemplary embodiment represented is reminiscent of a welding process. In contrast to a welding process, however, the surrounding base material of the turbine blade 1 is not melted.

In the present exemplary embodiment, the advantageous orientation of the directional microstructure in the superalloy of the turbine blade 1 extends from left to right in the plane of the drawing. In order to induce the creation of a directional microstructure in the solidified solder material, the orientation of which is the same as that in the base material, the movement of the laser 9 relative to the gas turbine blade 1 takes place perpendicularly to the preferential direction of the directional microstructure of the superalloy, parallel to the profile of the fatigue crack 3 (cf. FIG. 6). Optionally, the laser 9 may also execute a pendulum movement perpendicularly to the profile of the fatigue crack 3.

Figure 7:
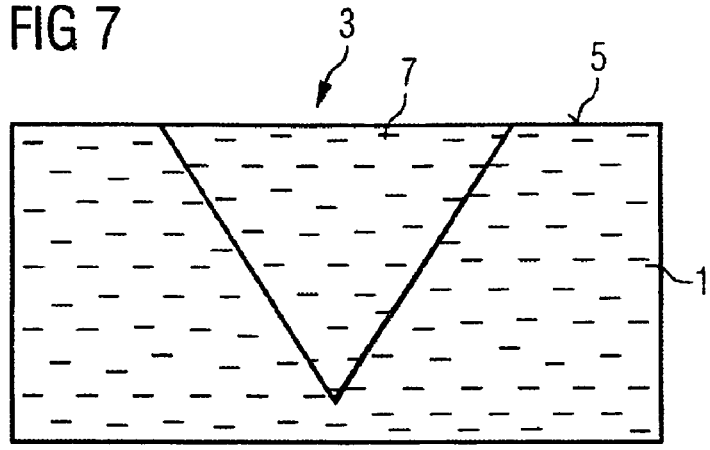

When the solder material 7 resolidifies, it will be epitaxially bonded to the surrounding superalloy material. In other words, the solidified alloy material 7 continues the crystalline structure of the adjacent superalloy material. After the solder material 7 has resolidified, it is therefore has the same directional microstructure as the adjacent superalloy. In this way, the crystalline structure of the superalloy material can grow into the solidifying alloy material. After the solder material 7 has resolidified, the repair site therefore has the same directional microstructure as the surrounding superalloy. This situation is indicated in FIG. 7.

Instead of moving the laser 9 continuously in order to induce a temperature gradient, the laser beams may also be expanded or allowed to swing so that the laser for example irradiates all of the solder material and heats it uniformly. In this case, a temperature gradient may be created by suitable dissipation of the heat from the solder material 7 into the surrounding alloy. The temperature is then greatest at the outer surface of the solder material 7 and decreases toward the interface of the solder material 7 with the superalloy of the turbine blade 1. In order to achieve suitable dissipation of the heat, the turbine blade 1 may optionally be cooled or heated at suitable sites so that the desired temperature gradient is set up in the solder material 7.

In the present exemplary embodiment, the melting and solidification of the solder material 7 were induced with the aid of a temperature gradient. As an alternative, however, it is also possible to carry out the soldering process with the use of an isothermal soldering method.

The method according to the invention not only offers the advantage that the additions of boron or silicon to the solder material 7 may be obviated; rather, it also allows cracks with a width of more than 200 μm to be repaired so that the solder material has a directional microstructure after its solidification, particularly when a temperature gradient is employed in the method.

The invention claimed is:

1. A solder material for soldering superalloy components having a directional microstructure, comprising:
   an alloy having
      alloy constituents that are the same as an alloy of the component and
      a proportion of an alloy constituent in the composition of the solder material modified relative to its proportion in the composition of the alloy of the component such that the melting temperature of the solder material is lowered relative to the melting temperature of the alloy of the component,
   wherein the alloy constituent includes at least one of the elements Al, Ti, Ta, Nb, and W,
   wherein the proportion of at least one of the elements Al and Ti is increased relative to the proportion in the superalloy and/or
   the proportion of the element W in the alloy of the solder material is reduced relative to its proportion in the superalloy;
   wherein the superalloy has the following composition:
   from 2 to 16 wt. % Cr
   from 0 to 15 wt. % Co
   from 0 to 3 wt. % Mo
   from 0 to 10 wt. % W
   from 0 to 12 wt. % Ta
   from 0 to 6 wt. % Re
   from 0 to 1 wt. % V
   from 0 to 0.5 wt. % Nb
   from 0.05 to 6.5 wt. % Al
   from 0 to 5 wt. % Ti
   from 0 to 0.2 wt. % Hf
   from 0 to 0.07 wt. % C
   remainder Ni, and
   the proportions of Al and/or Ta and/or Ti in the alloy of the solder material are increased relative to the composition of the superalloy.

2. A solder material for soldering superalloy components having a directional microstructure, comprising:
   an alloy having
      the same alloy constituents as the alloy of the component and
      a proportion of an alloy constituent in the composition of the solder material modified relative to its proportion in the composition of the alloy of the component such that the melting temperature of the solder material is lowered relative to the melting temperature of the alloy of the component, wherein the superalloy is a nickel- or cobalt-based superalloy, and it additionally comprises at least one of the elements Al, Ti, Ta, Cr, Co, Mo, W, and Nb as main alloy elements, and wherein the proportion of at least one of the elements Al, Ti, Ta, and Nb in the alloy of the solder material is increased relative to its proportion in the superalloy and/or the proportion of the element W in the alloy of the solder material is reduced relative to its proportion in the superalloy;

wherein the superalloy has the following composition:

from 2 to 16 wt. % Cr
from 0 to 15 wt. % Co
from 0 to 3 wt. % Mo
from 0 to 10 wt. % W
from 0 to 12 wt. % Ta
from 0 to 6 wt. % Re
from 0 to 1 wt. % V
from 0 to 0.5 wt. % Nb
from 0.05 to 6.5 wt. % Al
from 0 to 5 wt. % Ti
from 0 to 0.2 wt. % Hf
from 0 to 0.07 wt. % C
remainder Ni, and the proportions of Al and/or Ta and/or Ti in the alloy of the solder material are increased relative to the composition of the superalloy.

\* \* \* \* \*